United States Patent
Huynh et al.

(10) Patent No.: US 12,509,073 B2
(45) Date of Patent: Dec. 30, 2025

(54) PREDICTION VARIANCE ESTIMATION

(71) Applicant: Nissan North America, Inc., Franklin, TN (US)

(72) Inventors: Manh Huynh, Sunnyvale, CA (US); Christopher Ostafew, Mountain View, CA (US); Qizhan Tam, San Jose, CA (US); Huiching Chen, San Jose, CA (US)

(73) Assignee: Nissan North America, Inc., Franklin, TN (US)

( * ) Notice: Subject to any disclaimer, the term of this patent is extended or adjusted under 35 U.S.C. 154(b) by 169 days.

(21) Appl. No.: 18/241,041

(22) Filed: Aug. 31, 2023

(65) Prior Publication Data

US 2025/0074406 A1   Mar. 6, 2025

(51) Int. Cl.
*B60W 30/095* (2012.01)
*B60W 60/00* (2020.01)

(52) U.S. Cl.
CPC .... *B60W 30/0956* (2013.01); *B60W 60/0027* (2020.02); *B60W 2554/4044* (2020.02); *B60W 2556/40* (2020.02)

(58) Field of Classification Search
CPC ......... B60W 30/0956; B60W 60/0027; B60W 2556/40
See application file for complete search history.

(56) References Cited

U.S. PATENT DOCUMENTS

| | | | |
|---|---|---|---|
| 2015/0210280 A1* | 7/2015 | Agnew | B60W 10/192 701/70 |
| 2015/0282766 A1* | 10/2015 | Cole | A61B 5/1123 702/139 |
| 2021/0213978 A1* | 7/2021 | Edling | G06V 20/58 |
| 2021/0269059 A1* | 9/2021 | Djuric | B60W 60/0011 |
| 2021/0318138 A1 | 10/2021 | Muto | |
| 2022/0092983 A1* | 3/2022 | Hong | G05D 1/0278 |
| 2022/0363256 A1* | 11/2022 | Dax | B60W 40/105 |
| 2022/0379920 A1* | 12/2022 | Yang | B60W 30/12 |
| 2023/0043474 A1* | 2/2023 | Metz | B60W 60/0017 |
| 2023/0192144 A1* | 6/2023 | Chen | G06V 10/774 701/26 |
| 2023/0195830 A1* | 6/2023 | Raina | G06F 17/10 703/2 |
| 2023/0304896 A1* | 9/2023 | Zhu | B60W 40/09 |
| 2023/0386326 A1* | 11/2023 | Schneemann | G06V 40/20 |

FOREIGN PATENT DOCUMENTS

EP   3 848 266 A1   7/2021

* cited by examiner

*Primary Examiner* — Ryan Rink
(74) *Attorney, Agent, or Firm* — Young Basile Hanlon & MacFarlane, P.C.

(57) ABSTRACT

Observed driveline mean and variance data are used for determining the variance of a trajectory of tracked objects for use by a host vehicle. A map of a portion of a vehicle transportation network are determined, wherein the map is comprised of observed driveline mean and variance data for one or more map points. At least one trajectory of a tracked object is predicted, wherein a trajectory includes a series of location each corresponding to a respective predicted position of the tracked object at a future time. A map-based variance is generated for the location of the trajectory using a smoothed curvature of the trajectory within the map. A control system of the vehicle operates the vehicle using the map-based variance as input.

20 Claims, 11 Drawing Sheets

PREDICTION VARIANCE ESTIMATION

TECHNICAL FIELD

This application relates to controlling a vehicle and, more particularly, to controlling a vehicle using map-based prediction with variance estimation.

BACKGROUND

For safe and reliable operation, at least some sub-systems in a vehicle may include inherent self-monitoring capabilities, issue detection capabilities, and, if possible, remediation capabilities.

An autonomous or semi-autonomous vehicle (or more broadly, autonomous driving) offers passengers the convenience of efficient and safe conveyance from one location to another. The vehicle may plan a trajectory to traverse a portion of a vehicle transportation network based on scene understanding of the portion of a vehicle transportation network.

SUMMARY

Sub-optimal or inaccurate scene understanding may cause the programming of the vehicle to plan sub-optimal trajectories. As such, detecting, diagnosing, and possibly remedying errors related to scene misunderstanding can be advantageous in vehicle control.

The teachings herein describe the consideration of map-based prediction, which utilizes drive lane information, and the determination of the amount a vehicle may deviate from the map-based prediction, which relies on the motion of other road users for scene understanding. Through these considerations, challenges related to predicting the future trajectory of other road users, such as the potential for a road user to follow different paths or the possibility that the road user is deviating from a map lane, are used to better understand the scene for generating a trajectory of a host vehicle.

A first aspect of the disclosed implementations is a method including determining a map of a portion of a vehicle transportation network, wherein the map comprises observed driveline mean and variance data for one or more map points, predicting at least one trajectory for a tracked object, wherein a trajectory of the at least one trajectory includes a series of locations, a location of the series of location corresponding to a respective predicted position of the tracked object at a future time, generating, for the location of the trajectory, a map-based variance based on a smoothed curvature of the trajectory within the map, and operating a vehicle using the map-based variance as input to a control system of the vehicle.

A second aspect of the disclosed implementations is an apparatus including a processor. The processor is configured to determine a map of a portion of a vehicle transportation network, wherein the map comprises observed driveline mean and variance data for one or more map points, predict at least one trajectory for a tracked object, wherein a trajectory of the at least one trajectory includes a series of locations, a location of the series of location corresponding to a respective predicted position of the tracked object at a future time, generate, for the location of the trajectory, a map-based variance based on a smoothed curvature of the trajectory within the map, and operate a vehicle using the map-based variance as input to a control system of the vehicle.

A third aspect of the disclosed implementations is a non-transitory computer-readable medium storing instructions operable to cause one or more processors to perform operations that include determining a map of a portion of a vehicle transportation network, wherein the map comprises observed driveline mean and variance data for one or more map points, predicting at least one trajectory for a tracked object, wherein a trajectory of the at least one trajectory includes a series of locations, a location of the series of location corresponding to a respective predicted position of the tracked object at a future time, generating, for the location of the trajectory, a map-based variance based on a smoothed curvature of the trajectory within the map, and operating a vehicle using the map-based variance as input to a control system of the vehicle.

Variations in these and other aspects, features, elements, implementations, and embodiments of the methods, apparatus, and procedures disclosed herein are described in further detail hereafter.

BRIEF DESCRIPTION OF THE DRAWINGS

The disclosed technology is best understood from the following detailed description when read in conjunction with the accompanying drawings. It is emphasized that, according to common practice, the various features of the drawings may not be to scale. On the contrary, the dimensions of the various features may be arbitrarily expanded or reduced for clarity. Further, like reference numbers refer to like elements throughout the drawings unless otherwise noted.

DETAILED DESCRIPTION

Figure 1:
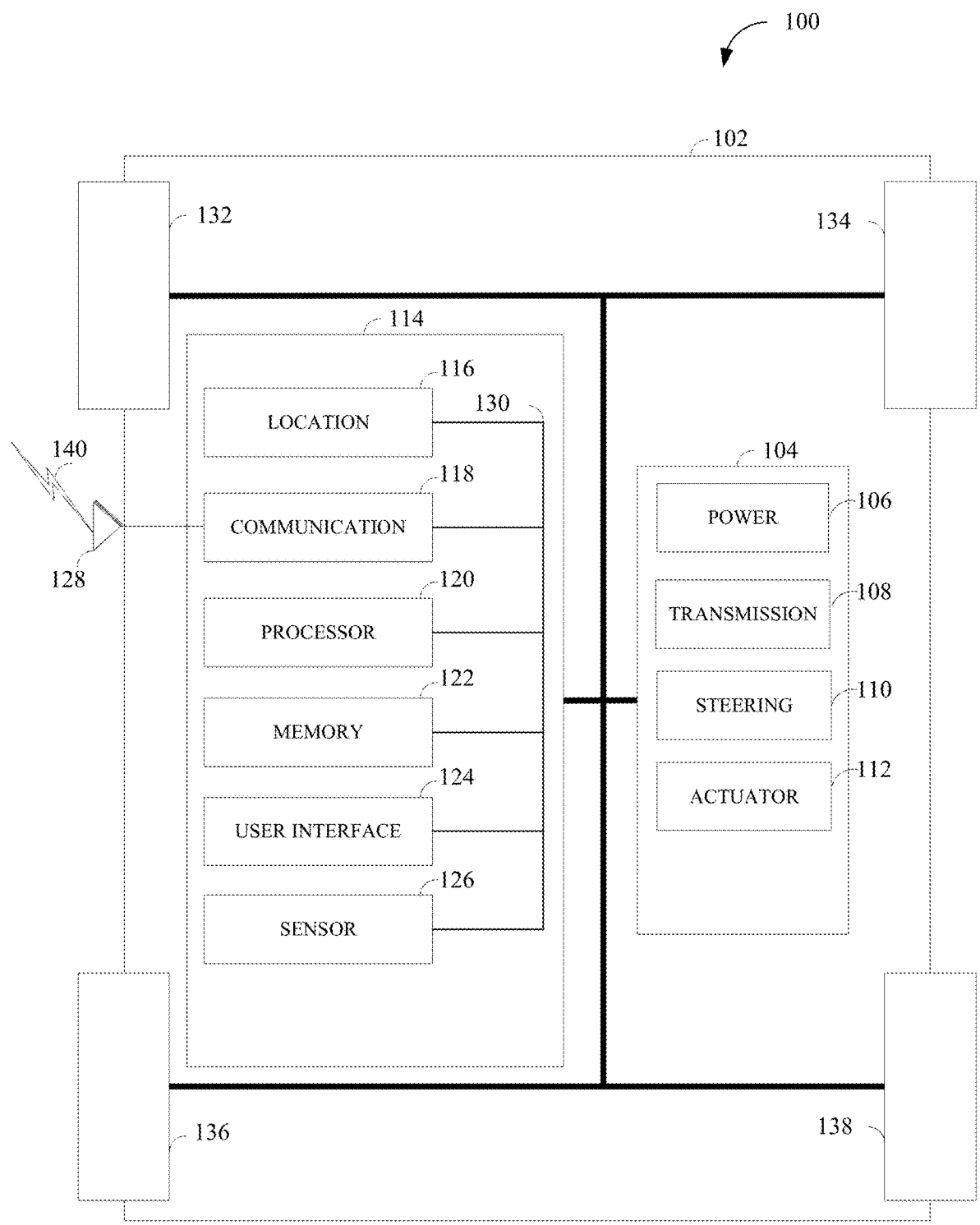
FIG. 1 is a diagram of an example of a portion of a vehicle in which the aspects, features, and elements disclosed herein may be implemented.

A vehicle (which may also be referred to herein as a host vehicle), such as an autonomous vehicle (AV), or a semi-autonomous vehicle, such as a vehicle including an advanced driver-assistance system (ADAS), may autonomously traverse a portion of a vehicle transportation network. Collectively, such vehicles may be referred to as autonomous vehicles.

The host vehicle may include one or more sensors. Traversing the vehicle transportation network may include the sensors generating or capturing sensor data, such as data corresponding to an operational environment of the vehicle, or a portion thereof. For example, the sensor data may include data corresponding to one or more external objects (or simply, objects) including other (i.e., other than the host vehicle itself) road users (such as other vehicles, bicycles, motorcycles, trucks, etc.) that may also be traversing the vehicle transportation network.

A trajectory can be planned (such as by a trajectory planner of the host vehicle) based on scene understanding. A scene can include the external objects (e.g., the road users) detected using sensors of the host vehicle, including static and dynamic objects. Scene understanding can include predicted trajectories of at least some of the other road users. A scene can also include data available in a high-definition (HD) map. The HD map can include driveline data. A driveline can be a line of a lane such that a longitudinal axis of a road user traversing the lane can be expected to align with the driveline. As such, scene understanding can include drivelines of the predicted trajectories of at least some of the other road users.

The trajectory planner can receive anticipated (i.e., predicted) trajectories of other road users of the vehicle transportation network. The trajectories can be received from another module (e.g., a world model module) of the host vehicle. For detected dynamic objects (e.g., a road user, such as a vehicle, a pedestrian, a bicycle, and the like), the world model module can maintain (e.g., predict and update) one or more respective hypothesis regarding the possible intentions of the road users. Examples of intentions (e.g., hypotheses) include stop, turn right, turn left, go straight, pass, park, and the like. A likelihood may be associated with each hypothesis. The likelihood can be updated based on observations (e.g., actual data) associated with the real-world objects received based on sensor data.

The road users can be detected based on received sensor data (also referred to herein as measurements or sensor observations). The world model module can maintain (i.e., associate and updates over time) a state for each hypothesis (e.g., intention) associated with a road user. For example, the state can include poses of the road user based on the intention of a hypothesis.

However, poor or inaccurate scene understanding (collectively, inaccurate scene understanding) may cause the trajectory planner of the vehicle to plan sub-optimal or unsafe trajectories for the host vehicle. Inaccurate scene understanding can mean, can include, or can result in the host vehicle determining predictions for at least some other road users that do not match the actual performances of the other road users.

Inaccurate scene understanding may occur in several situations. For example, inaccurate scene understanding may occur when the data in the HD map is inaccurate. For example, inaccurate scene understanding may occur if the data in the HD map is accurate, but road users drive in ways that are not according to the data in the HD map. To illustrate, and without loss of generality, a left-turn driveline at an intersection may be accurately mapped; however, most road users may drive past the mapped driveline before turning left at the interaction. It is noted that there can be a wide variance on how drivers make the turn (or confront any other driving situation or driveline).

The teachings herein consider both map-based prediction and variances to the map-based predictions to improve the prediction of future trajectories of other road users to better plan a host vehicle trajectory.

Although described herein with reference to an autonomous host vehicle, the techniques and apparatuses described herein may be implemented in any vehicle capable of autonomous or semi-autonomous operation. The teachings herein may be used within a vehicle transportation network, which can include any area navigable by a host vehicle.

To describe some implementations of the teachings herein in greater detail, reference is first made to an environment in which this disclosure may be implemented.

FIG. 1 is a diagram of an example of a portion of a vehicle 100 in which the aspects, features, and elements disclosed herein may be implemented. The vehicle 100 includes a chassis 102, a powertrain 104, a controller 114, wheels 132/134/136/138, and may include any other element or combination of elements of a vehicle. Although the vehicle 100 is shown as including four wheels 132/134/136/138 for simplicity, any other propulsion device or devices, such as a propeller or tread, may be used. In FIG. 1, the lines interconnecting elements, such as the powertrain 104, the controller 114, and the wheels 132/134/136/138, indicate that information, such as data or control signals, power, such as electrical power or torque, or both information and power, may be communicated between the respective elements. For example, the controller 114 may receive power from the powertrain 104 and communicate with the powertrain 104, the wheels 132/134/136/138, or both, to control the vehicle 100, which can include accelerating, decelerating, steering, or otherwise controlling the vehicle 100.

The powertrain 104 includes a power source 106, a transmission 108, a steering unit 110, a vehicle actuator 112, and may include any other element or combination of elements of a powertrain, such as a suspension, a drive shaft, axles, or an exhaust system. Although shown separately, the wheels 132/134/136/138 may be included in the powertrain 104.

The power source 106 may be any device or combination of devices operative to provide energy, such as electrical energy, thermal energy, or kinetic energy. For example, the power source 106 includes an engine, such as an internal combustion engine, an electric motor, or a combination of an internal combustion engine and an electric motor, and the power source 106 is operative to provide kinetic energy as a motive force to one or more of the wheels 132/134/136/138. In some embodiments, the power source 106 includes a potential energy unit, such as one or more dry cell batteries, such as nickel-cadmium (NiCd), nickel-zinc (NiZn), nickel metal hydride (NiMH), lithium-ion (Li-ion); solar cells; fuel cells; or any other device capable of providing energy.

The transmission 108 receives energy, such as kinetic energy, from the power source 106 and transmits the energy to the wheels 132/134/136/138 to provide a motive force. The transmission 108 may be controlled by the controller 114, the vehicle actuator 112, or both. The steering unit 110 may be controlled by the controller 114, the vehicle actuator 112, or both and controls the wheels 132/134/136/138 to steer the vehicle. The vehicle actuator 112 may receive signals from the controller 114 and may actuate or control the power source 106, the transmission 108, the steering unit 110, or any combination thereof to operate the vehicle 100.

In the illustrated embodiment, the controller 114 includes a location unit 116, an electronic communication unit 118, a processor 120, a memory 122, a user interface 124, a sensor 126, and an electronic communication interface 128. Although shown as a single unit, any one or more elements of the controller 114 may be integrated into any number of separate physical units. For example, the user interface 124 and the processor 120 may be integrated in a first physical unit, and the memory 122 may be integrated in a second physical unit. Although not shown in FIG. 1, the controller 114 may include a power source, such as a battery. Although shown as separate elements, the location unit 116, the electronic communication unit 118, the processor 120, the memory 122, the user interface 124, the sensor 126, the electronic communication interface 128, or any combination thereof can be integrated in one or more electronic units, circuits, or chips.

In some embodiments, the processor 120 includes any device or combination of devices, now-existing or hereafter developed, capable of manipulating or processing a signal or other information, for example optical processors, quantum processors, molecular processors, or a combination thereof. For example, the processor 120 may include one or more special-purpose processors, one or more digital signal processors, one or more microprocessors, one or more controllers, one or more microcontrollers, one or more integrated circuits, one or more Application Specific Integrated Circuits, one or more Field Programmable Gate Arrays, one or more programmable logic arrays, one or more programmable logic controllers, one or more state machines, or any combination thereof. The processor 120 may be operatively coupled with the location unit 116, the memory 122, the electronic communication interface 128, the electronic communication unit 118, the user interface 124, the sensor 126, the powertrain 104, or any combination thereof. For example, the processor may be operatively coupled with the memory 122 via a communication bus 130.

The processor 120 may be configured to execute instructions. Such instructions may include instructions for remote operation, which may be used to operate the vehicle 100 from a remote location, including the operations center. The instructions for remote operation may be stored in the vehicle 100 or received from an external source, such as a traffic management center, or server computing devices, which may include cloud-based server computing devices.

The memory 122 may include any tangible non-transitory computer-usable or computer-readable medium capable of, for example, containing, storing, communicating, or transporting machine-readable instructions or any information associated therewith, for use by or in connection with the processor 120. The memory 122 may include, for example, one or more solid state drives, one or more memory cards, one or more removable media, one or more read-only memories (ROM), one or more random-access memories (RAM), one or more registers, one or more low power double data rate (LPDDR) memories, one or more cache memories, one or more disks (including a hard disk, a floppy disk, or an optical disk), a magnetic or optical card, or any type of non-transitory media suitable for storing electronic information, or any combination thereof.

The electronic communication interface 128 may be a wireless antenna, as shown, a wired communication port, an optical communication port, or any other wired or wireless unit capable of interfacing with a wired or wireless electronic communication medium 140.

The electronic communication unit 118 may be configured to transmit or receive signals via the wired or wireless electronic communication medium 140, such as via the electronic communication interface 128. Although not explicitly shown in FIG. 1, the electronic communication unit 118 is configured to transmit, receive, or both via any wired or wireless communication medium, such as radio frequency (RF), ultra-violet (UV), visible light, fiber optic, wire line, or a combination thereof. Although FIG. 1 shows a single one of the electronic communication unit 118 and a single one of the electronic communication interface 128, any number of communication units and any number of communication interfaces may be used. In some embodiments, the electronic communication unit 118 can include a dedicated short-range communications (DSRC) unit, a wireless safety unit (WSU), IEEE 802.11p (WiFi-P), or a combination thereof.

The location unit 116 may determine geolocation information, including but not limited to longitude, latitude, elevation, direction of travel, or speed, of the vehicle 100. For example, the location unit includes a global positioning system (GPS) unit, such as a Wide Area Augmentation System (WAAS) enabled National Marine Electronics Association (NMEA) unit, a radio triangulation unit, or a combination thereof. The location unit 116 can be used to obtain information that represents, for example, a current heading of the vehicle 100, a current position of the vehicle 100 in two or three dimensions, a current angular orientation of the vehicle 100, or a combination thereof.

The user interface 124 may include any unit capable of being used as an interface by a person, including any of a virtual keypad, a physical keypad, a touchpad, a display, a touchscreen, a speaker, a microphone, a video camera, a sensor, and a printer. The user interface 124 may be operatively coupled with the processor 120, as shown, or with any other element of the controller 114. Although shown as a single unit, the user interface 124 can include one or more physical units. For example, the user interface 124 includes an audio interface for performing audio communication with a person, and a touch display for performing visual and touch-based communication with the person.

The sensor 126 may include one or more sensors, such as an array of sensors, which may be operable to provide information that may be used to control the vehicle. The sensor 126 can provide information regarding current operating characteristics of the vehicle or its surroundings. The sensor 126 includes, for example, a speed sensor, acceleration sensors, a steering angle sensor, traction-related sensors, braking-related sensors, or any sensor, or combination of sensors, that is operable to report information regarding some aspect of the current dynamic situation of the vehicle 100.

In some embodiments, the sensor 126 includes sensors that are operable to obtain information regarding the physical environment surrounding the vehicle 100. For example, one or more sensors detect road geometry and obstacles, such as fixed obstacles, vehicles, cyclists, and pedestrians. The sensor 126 can be or include one or more video cameras, laser-sensing systems, infrared-sensing systems, acoustic-sensing systems, or any other suitable type of on-vehicle environmental sensing device, or combination of devices, now known or later developed. The sensor 126 and the location unit 116 may be combined.

Although not shown separately, the vehicle 100 may include a trajectory controller. For example, the controller 114 may include a trajectory controller. The trajectory controller may be operable to obtain information describing a current state of the vehicle 100 and a route planned for the vehicle 100, and, based on this information, to determine and optimize a trajectory for the vehicle 100. In some embodiments, the trajectory controller outputs signals operable to control the vehicle 100 such that the vehicle 100 follows the trajectory that is determined by the trajectory controller. For example, the output of the trajectory controller can be an optimized trajectory that may be supplied to the powertrain 104, the wheels 132/134/136/138, or both. The optimized trajectory can be a control input, such as a set of steering angles, with each steering angle corresponding to a point in time or a position. The optimized trajectory can be one or more paths, lines, curves, or a combination thereof.

One or more of the wheels 132/134/136/138 may be a steered wheel, which is pivoted to a steering angle under control of the steering unit 110; a propelled wheel, which is torqued to propel the vehicle 100 under control of the transmission 108; or a steered and propelled wheel that steers and propels the vehicle 100.

A vehicle may include units or elements not shown in FIG. 1, such as an enclosure, a Bluetooth® module, a frequency modulated (FM) radio unit, a Near-Field Communication (NFC) module, a liquid crystal display (LCD) display unit, an organic light-emitting diode (OLED) display unit, a speaker, or any combination thereof.

Figure 2:
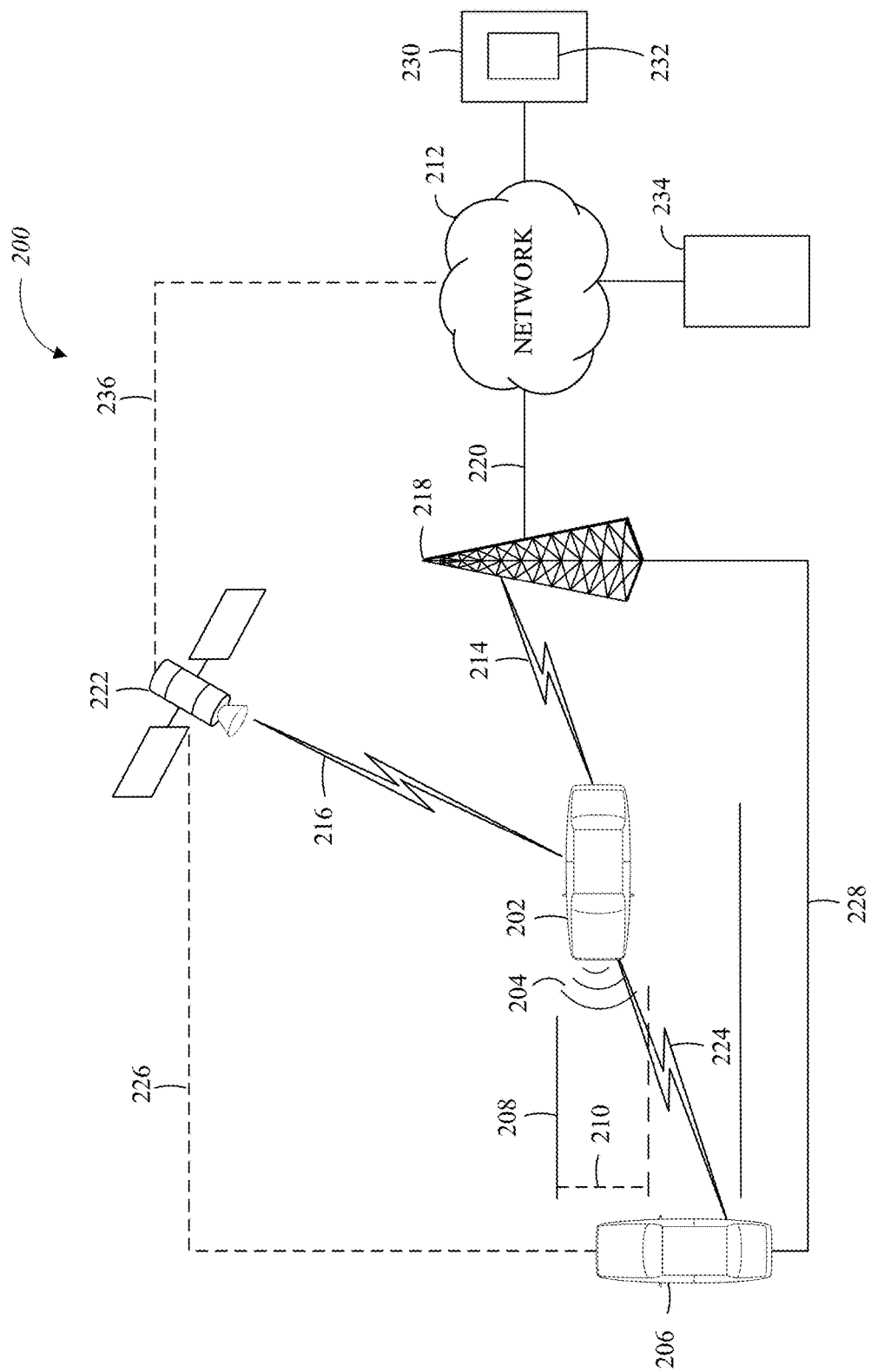
FIG. 2 is a diagram of an example of a portion of a vehicle transportation and communication system in which the aspects, features, and elements disclosed herein may be implemented.

FIG. 2 is a diagram of an example of a portion of a vehicle transportation and communication system 200 in which the aspects, features, and elements disclosed herein may be implemented. The vehicle transportation and communication system 200 includes a vehicle 202, such as the vehicle 100 shown in FIG. 1, and one or more external objects, such as an external object 206, which can include any form of transportation, such as the vehicle 100 shown in FIG. 1, a pedestrian, cyclist, as well as any form of a structure, such as a building. The vehicle 202 may travel via one or more portions of a transportation network 208, and may communicate with the external object 206 via one or more of an electronic communication network 212. Although not explicitly shown in FIG. 2, a vehicle may traverse an area that is not expressly or completely included in a transportation network, such as an off-road area. In some embodiments, the transportation network 208 may include one or more of a vehicle detection sensor 210, such as an inductive loop sensor, which may be used to detect the movement of vehicles on the transportation network 208.

The electronic communication network 212 may be a multiple access system that provides for communication, such as voice communication, data communication, video communication, messaging communication, or a combination thereof, between the vehicle 202, the external object 206, and an operations center 230. For example, the vehicle 202 or the external object 206 may receive information, such as information representing the transportation network 208, from the operations center 230 via the electronic communication network 212.

The operations center 230 includes a controller apparatus 232, which includes some or all features of the controller 114 shown in FIG. 1. The controller apparatus 232 can monitor and coordinate the movement of vehicles, including autonomous vehicles. The controller apparatus 232 may monitor the state or condition of vehicles, such as the vehicle 202, and external objects, such as the external object 206. The controller apparatus 232 can receive vehicle data and infrastructure data including any of: vehicle velocity; vehicle location; vehicle operational state; vehicle destination; vehicle route; vehicle sensor data; external object velocity; external object location; external object operational state; external object destination; external object route; and external object sensor data.

Further, the controller apparatus 232 can establish remote control over one or more vehicles, such as the vehicle 202, or external objects, such as the external object 206. In this way, the controller apparatus 232 may teleoperate the vehicles or external objects from a remote location. The controller apparatus 232 may exchange (send or receive) state data with vehicles, external objects, or a computing device, such as the vehicle 202, the external object 206, or a server computing device 234, via a wireless communication link, such as the wireless communication link 226, or a wired communication link, such as the wired communication link 228.

The server computing device 234 may include one or more server computing devices, which may exchange (send or receive) state signal data with one or more vehicles or computing devices, including the vehicle 202, the external object 206, or the operations center 230, via the electronic communication network 212.

In some embodiments, the vehicle 202 or the external object 206 communicates via the wired communication link 228, a wireless communication link 214/216/224, or a combination of any number or types of wired or wireless communication links. For example, as shown, the vehicle 202 or the external object 206 communicates via a terrestrial wireless communication link 214, via a non-terrestrial wireless communication link 216, or via a combination thereof. In some implementations, a terrestrial wireless communication link 214 includes an Ethernet link, a serial link, a Bluetooth link, an infrared (IR) link, an ultraviolet (UV) link, or any link capable of electronic communication.

A vehicle, such as the vehicle 202, or an external object, such as the external object 206, may communicate with another vehicle, external object, or the operations center 230. For example, a host, or subject, vehicle 202 may receive one or more automated inter-vehicle messages, such as a basic safety message (BSM), from the operations center 230 via a direct communication link 224 or via an electronic communication network 212. For example, the operations center 230 may broadcast the message to host vehicles within a defined broadcast range, such as three hundred meters, or to a defined geographical area. In some embodiments, the vehicle 202 receives a message via a third party, such as a signal repeater (not shown) or another remote vehicle (not shown). In some embodiments, the vehicle 202 or the external object 206 transmits one or more automated inter-vehicle messages periodically based on a defined interval, such as one hundred milliseconds.

The vehicle 202 may communicate with the electronic communication network 212 via an access point 218. The access point 218, which may include a computing device, is configured to communicate with the vehicle 202, with the electronic communication network 212, with the operations center 230, or with a combination thereof via wired or wireless communication links 214/220. For example, an access point 218 is a base station, a base transceiver station (BTS), a Node-B, an enhanced Node-B (eNode-B), a Home Node-B (HNode-B), a wireless router, a wired router, a hub, a relay, a switch, or any similar wired or wireless device. Although shown as a single unit, an access point can include any number of interconnected elements.

The vehicle 202 may communicate with the electronic communication network 212 via a satellite 222 or other non-terrestrial communication device. The satellite 222, which may include a computing device, may be configured to communicate with the vehicle 202, with the electronic communication network 212, with the operations center 230, or with a combination thereof via one or more communication links 216/236. Although shown as a single unit, a satellite can include any number of interconnected elements.

The electronic communication network 212 may be any type of network configured to provide for voice, data, or any other type of electronic communication. For example, the electronic communication network 212 includes a local area network (LAN), a wide area network (WAN), a virtual private network (VPN), a mobile or cellular telephone network, the Internet, or any other electronic communication system. The electronic communication network 212 may use a communication protocol, such as the Transmission Control Protocol (TCP), the User Datagram Protocol (UDP), the Internet Protocol (IP), the Real-time Transport Protocol (RTP), the Hyper Text Transport Protocol (HTTP), or a combination thereof. Although shown as a single unit, an electronic communication network can include any number of interconnected elements.

In some embodiments, the vehicle 202 communicates with the operations center 230 via the electronic communication network 212, access point 218, or satellite 222. The operations center 230 may include one or more computing devices, which are able to exchange (send or receive) data from a vehicle, such as the vehicle 202; data from external objects, including the external object 206; or data from a computing device, such as the server computing device 234.

In some embodiments, the vehicle 202 identifies a portion or condition of the transportation network 208. For example, the vehicle 202 may include one or more on-vehicle sensors 204, such as the sensor 126 shown in FIG. 1, which includes a speed sensor, a wheel speed sensor, a camera, a gyroscope, an optical sensor, a laser sensor, a radar sensor, a sonic sensor, or any other sensor or device or combination thereof capable of determining or identifying a portion or condition of the transportation network 208.

The vehicle 202 may traverse one or more portions of the transportation network 208 using information communicated via the electronic communication network 212, such as information representing the transportation network 208, information identified by one or more on-vehicle sensors 204, or a combination thereof. The external object 206 may be capable of all or some of the communications and actions described above with respect to the vehicle 202.

For simplicity, FIG. 2 shows the vehicle 202 as the host vehicle, the external object 206, the transportation network 208, the electronic communication network 212, and the operations center 230. However, any number of vehicles, networks, or computing devices may be used. In some embodiments, the vehicle transportation and communication system 200 includes devices, units, or elements not shown in FIG. 2.

Although the vehicle 202 is shown communicating with the operations center 230 via the electronic communication network 212, the vehicle 202 (and the external object 206) may communicate with the operations center 230 via any number of direct or indirect communication links. For example, the vehicle 202 or the external object 206 may communicate with the operations center 230 via a direct communication link, such as a Bluetooth communication link. Although, for simplicity, FIG. 2 shows one of each of the transportation network 208 and the electronic communication network 212, any number of networks or communication devices may be used.

The external object 206 is illustrated as a second, remote vehicle in FIG. 2. An external object is not limited to another vehicle. An external object may be any infrastructure element, for example, a fence, a sign, a building, etc., that has the ability transmit data to the operations center 230. The data may be, for example, sensor data from the infrastructure element.

Figure 3:
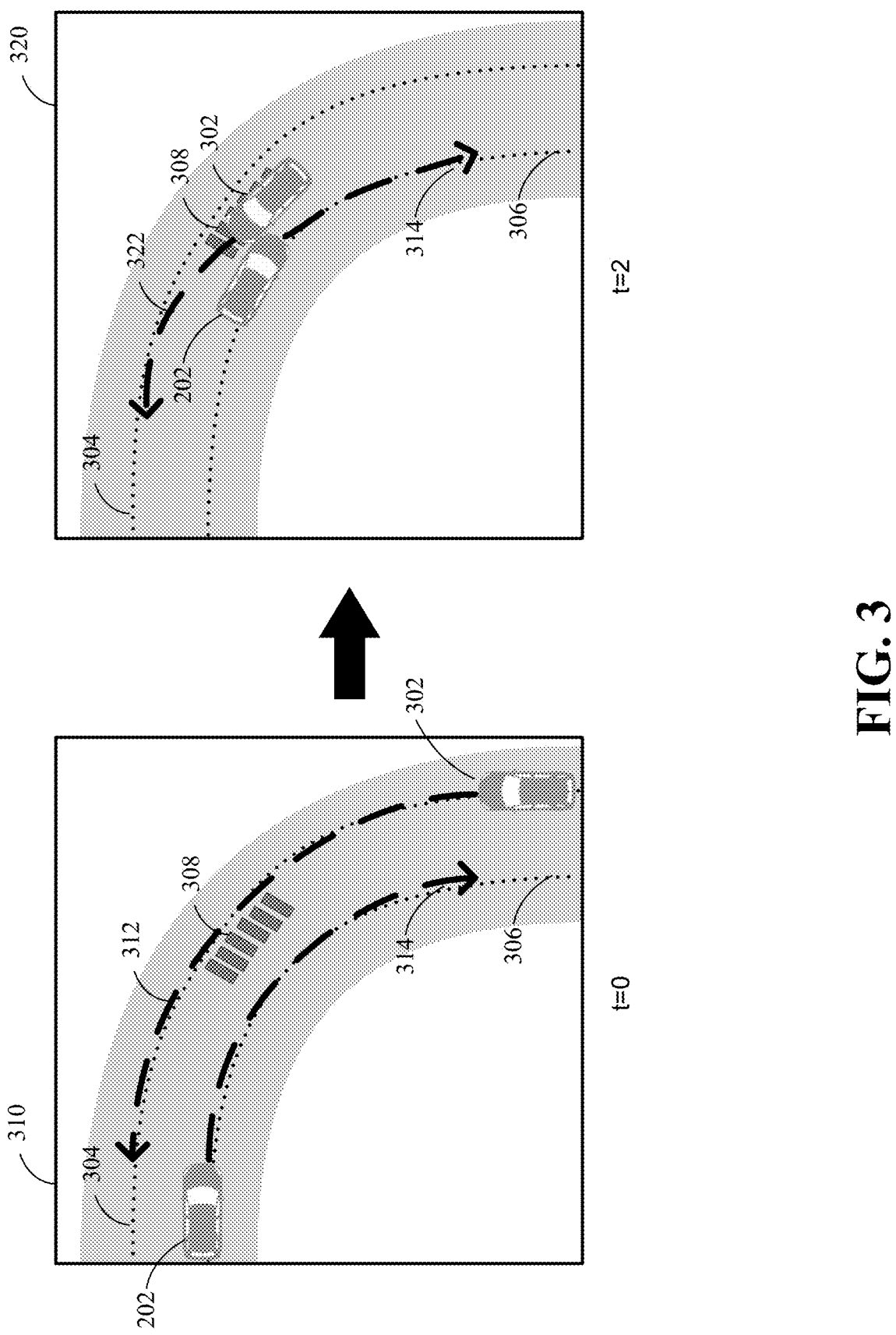
FIG. 3 is a diagram of situations of predicted and actual trajectories.

FIG. 3 is a diagram of situations of predicted and actual trajectories. The situation 310 illustrates an example of a predicted trajectory 312 of a tracked object 302 and a planned trajectory 314 of the vehicle 202 based on HD map data at time t=0. At t=0 the vehicle 202 detects an oncoming vehicle (i.e., the tracked object 302). The tracked object 302 may be the external object 206 of FIG. 2. The tracked object 302 may be moving in substantially the same (or at least substantially the same) longitudinal direction as the vehicle 202. As such, the tracked object 302 may be classified as a longitudinal constraint. The tracked object 302 is moving in the direction opposite of the vehicle 202. As such, the tracked object 302 may be classified as an oncoming longitudinal constraint.

The vehicle 202 may predict that the tracked object 302 will follow a predicted trajectory 312. The predicted trajectory 312 overlaps with a centerline 304 of the road. The vehicle 202 may determine a planned trajectory 314 that overlaps with a centerline 306 of the road based on the predicted trajectory 312 of the tracked object 302.

The situation 320 illustrates an example of an actual trajectory 322 of the tracked object 302 and the planned trajectory 314 of the vehicle 202 at time t=2. The tracked object 302 may not follow the planned trajectory 314 based on the centerline 304. The tracked object 302 may deviate from the predicted trajectory 312 at a variance 308 because not all road users follow the same driveline or centerlines of the road. As such, there exists a risk that the vehicle 202 and the tracked object 302 collide unless further action.

Figure 4:
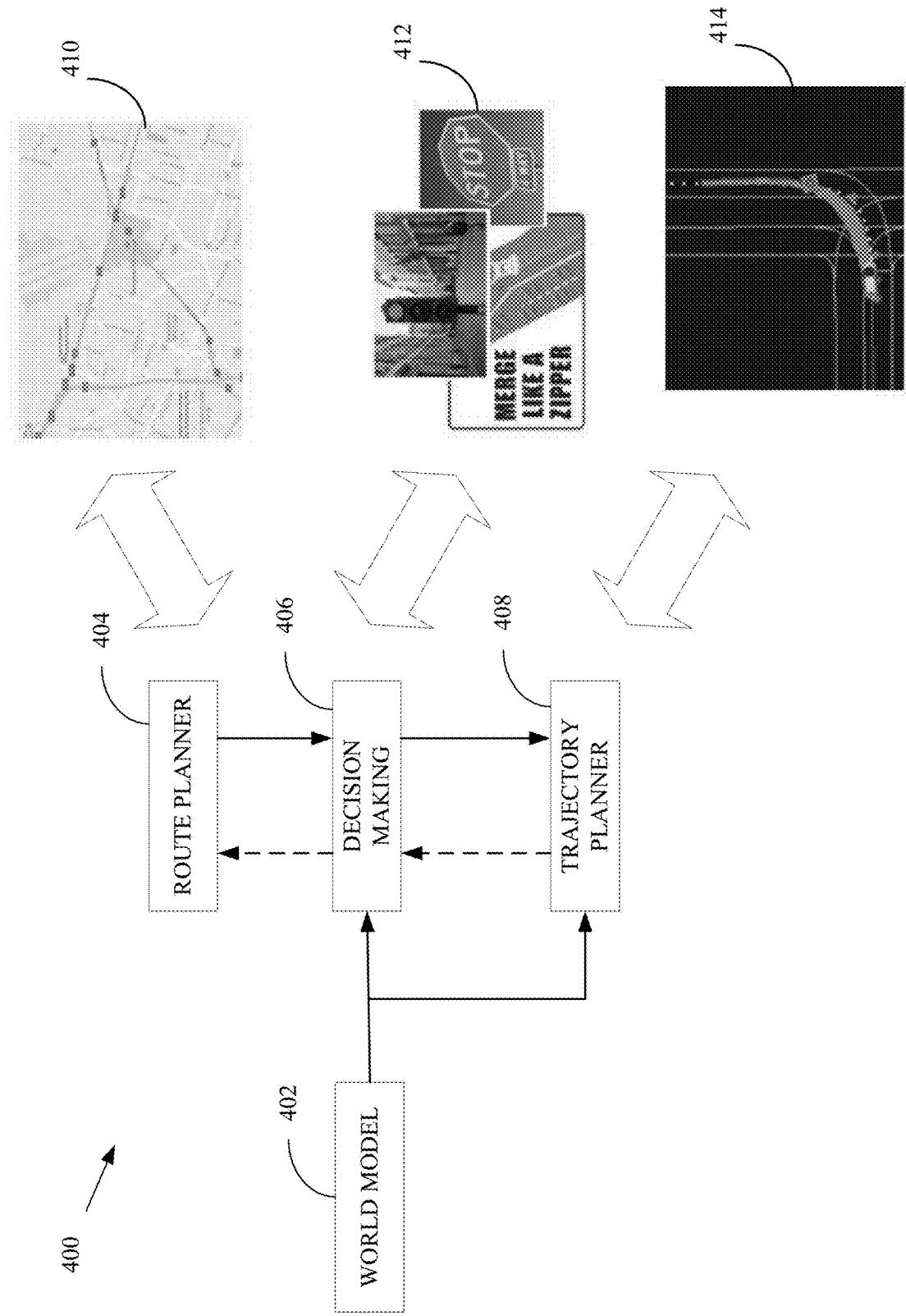
FIG. 4 is an overview of a system for an autonomous vehicle.

FIG. 4 is an example of components of a system 400 for an autonomous vehicle. The system 400 may represent a software pipeline of an autonomous vehicle, such as the vehicle 100 of FIG. 1. The system 400 includes a world model module 402, a route planning module 404, a decision-making module 406, and a trajectory planner 408. Other examples of the system 400 can include more, fewer, or other modules. In some examples, the modules can be combined; in other examples, a module can be divided into one or more other modules.

The world model module 402 receives sensor data, such as from the sensor 126 of FIG. 1, and determines (e.g., converts to, detects, etc.) objects from the sensor data. That is, for example, the world model module 402 determines the road users from the received sensor data. In some implementations, the world model module 402 can convert a point cloud received from a light detection and ranging (LiDAR) sensor into an object. Sensor data from several sensors can be fused together to determine (e.g., guess the identity of) the objects. Examples of objects include a bicycle, a pedestrian, a vehicle, etc.

The world model module 402 can receive sensor information that allows the world model module 402 to calculate and maintain additional information for at least some of the detected objects. For example, the world model module 402 can maintain a state for at least some of the determined objects. For example, the state for an object can include one or more of a velocity, a pose, a geometry (such as width, height, and depth), a classification (e.g., bicycle, large truck, pedestrian, road sign, etc.), and a location. As such, the state of an object can include discrete state information (e.g., classification) and continuous state information (e.g., pose and velocity).

The world model module 402 fuses sensor information, tracks objects, maintains lists of hypotheses for at least some of the dynamic objects (e.g., an object A might be going straight, turning right, or turning left), creates and maintains predicted trajectories for each hypothesis, and maintains likelihood estimates of each hypothesis (e.g., object A is going straight with probability 90% considering the object pose/velocity and the trajectory poses/velocities). In an example, the world model module 402 uses an instance of the trajectory planner, which generates a reference driveline for each object hypothesis for at least some of the dynamic objects. For example, one or more instances of the trajectory planner can be used to generate reference drivelines for vehicles, bicycles, and pedestrians. In another example, an instance of the trajectory planner can be used to generate reference drivelines for vehicles and bicycles, and a different method can be used to generate reference drivelines (e.g., references paths) for pedestrians.

The objects maintained by the world model module 402 can include static objects and/or dynamic objects. The tracked object 302 of FIG. 3 may be included in the object maintained by the world model module 402.

The route planning module 404 determines a road-level plan, such as illustrated with respect to a road-level plan 410. For example, given a starting location and a destination location, the route planning module 404 determines a route from the starting location to the destination location. For example, the route planning module 404 can determine the list of roads (i.e., the road-level plan) to be followed by the AV to navigate from the starting location to the destination location.

The road-level plan determined by the route planning module 404 and the objects (and corresponding state information) maintained by the world model module 402 can be used by the decision-making module 406 to determine discrete-level decisions along the road-level plan. An example of decisions included in the discrete-level decisions is illustrated with respect to discrete decisions 412. An example of discrete-level decisions may include a decision to stop at the interaction between road A and road B, a decision to move forward slowly, a decision to accelerate to a certain speed limit, a decision to merge onto the rightmost lane, etc.

The trajectory planner 408 can receive the discrete-level decisions, the objects (and corresponding state information) maintained by the world model module 402, and the predicted trajectories and likelihoods of the external objects from the world model module 402. The trajectory planner 408 can use at least some of the received information to determine a detailed-planned trajectory for the autonomous vehicle.

For example, as illustrated with respect to a detailed-planned trajectory 414, the trajectory planner 408 determines a next-few-seconds trajectory. As such, and in an example where the next few seconds are the next 6 seconds (i.e., a look-ahead time of 6 seconds), the trajectory planner 408 determines a trajectory and locations for the autonomous vehicle in the next 6 seconds. For example, the trajectory planner 408 may determine (e.g., predict, calculate, etc.) the expected locations of the autonomous vehicle at several time intervals (e.g., every one-quarter of a second, or some other time intervals). The trajectory planner 408 can determine the detailed-planned trajectory based on predictable responses of other road users, as described, for example, with respect to FIG. 3.

Figure 5:
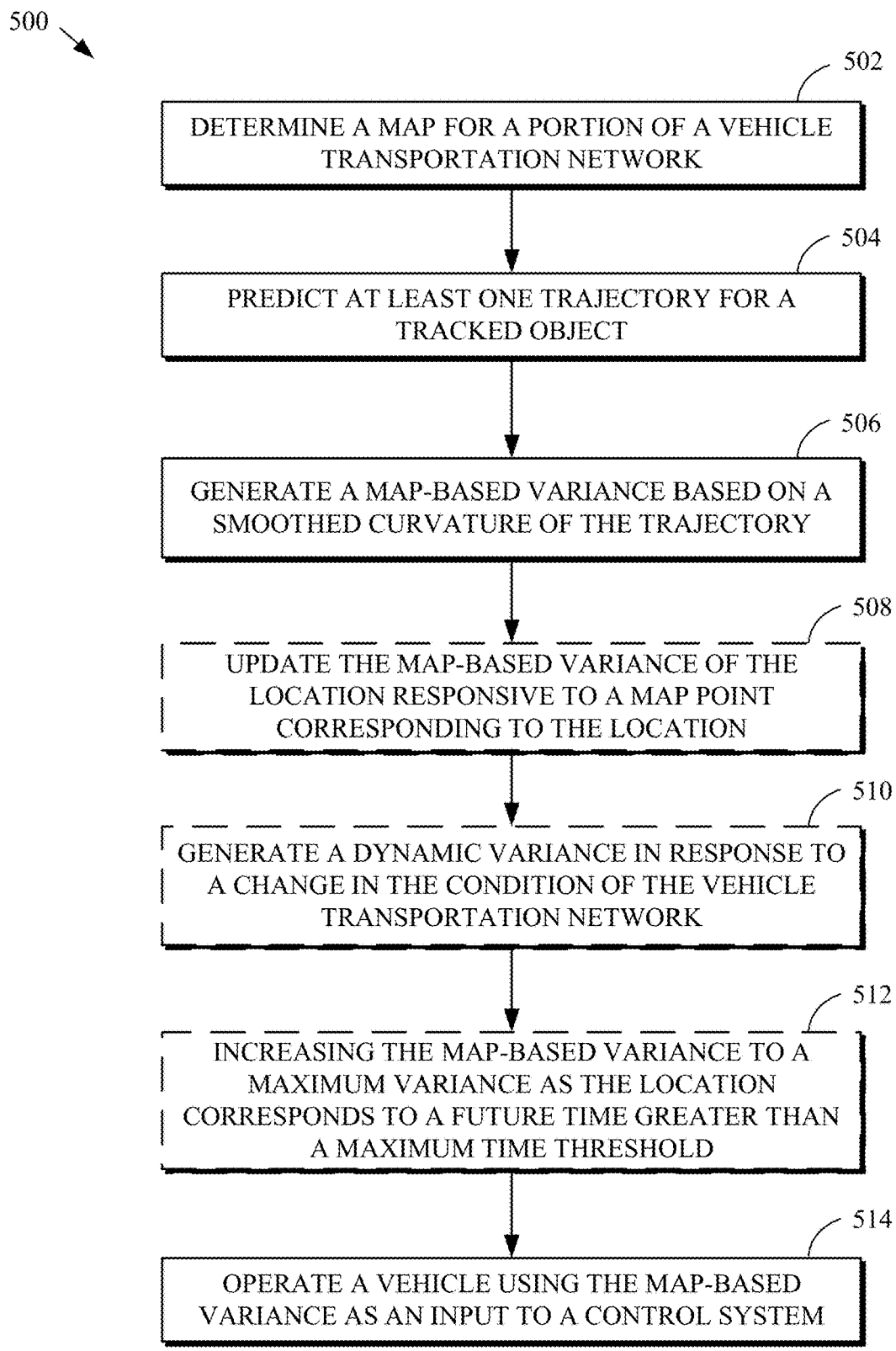
FIG. 5 is a flowchart of an example of a process for using prediction variance estimation as an input to a controlling system of a vehicle.

FIG. 5 is a flowchart of an example of a process 500 for using prediction variance estimation as an input to a controlling system of a vehicle. The process 500 includes operations 502 through 514, which are described below. The process 500 can be implemented in whole or in part by a world model module, such as the world model module 402 of FIG. 4. The process 500 can be stored in a memory (such as the memory 122 of FIG. 1) as instructions that can be executed by a processor (such as the processor 120 of FIG. 1) of an AV (such as the vehicle 100 of FIG. 1). The process 500 may be implemented in whole or in part by a remote support system, such as at the server computing device 234.

The process 500 may receive inputs, the inputs may include sensor data (i.e., sensor observations), such as the measurement from one or more sensors 126. The sensor data can be used to detect real-world objects. That is, for example, the sensor data can be used to determine that a real-world object exists within the view of the AV.

In an example, data from one or more cameras can be used to determine the class of a detected object. Non-limiting examples of classes include "car," "sports car," "sedan," "large truck," "pedestrian," and "bicycle." In another example, a classification can be assigned based on the motion, over time, of light detection and ranging (LiDAR) data, e.g., a LiDAR point cloud. It is noted that different sensor data may provide different object classifications. For example, a first classification of "bicycle" may be determined based on the LiDAR data whereas a second classification of "jogger" may be determined based on camera data. Accordingly, the classification of an object may be determined probabilistically (e.g., which of the first or second classifications is more likely). As the classification is probabilistic, the classification of an object can change over time. Different sensor data may be fused together to determine the classification.

In an implementation, the process 500 receives as inputs the pose and the velocity for a detected object. In an implementation, the process 500 receives, as additional inputs, one or more of the geometry or the classification for a detected object. As such, the classification can be received as an input, rather than being determined by the process 500. The inputs may also include map information. The map information can include map lane structures (also referred to herein as road structures or mapped lanes). The map lane structure of a given lane can include successor lane information, predecessor lane information, and sibling lane information.

At operation 502, the process 500 determines a map for a portion of a vehicle transportation network. The map may correspond to a portion of the vehicle transportation for which the vehicle 202 is traversing, in other words, a relevant portion of the vehicle transportation network. The map may be determined based on observed driveline mean and variance data. The observed driveline mean and variance data may be received by the vehicle 202 from the external object 206, or from a computing device, such as the server computing device 234 of FIG. 2. Alternatively, the observed driveline mean and variance data may be retrieved from the vehicle 202, such as from the memory 122 of FIG. 1. Using the driveline mean and variance data the process 500 may determine a map for the relevant portion of the vehicle transportation network.

The observed driveline mean and variance data may be represented by a series of map points. Each map point may represent a different location within the vehicle transportation network. Each location within the vehicle transportation network may have one than one map point associated with it. For example, at any location within the vehicle transportation network there may be more than one observed driveline. Each driveline associated with the location of the vehicle transportation network may be associated with the same map point. However, the mean and variance data may be offset from the other observed driveline data given that different road users tend to follow slightly different paths.

At operation 504, the process 500 predicts at least one trajectory for a tracked object. The trajectory for a tracked object may be the first few seconds of a predicted path. The predicted path of the tracked object may be thought of as a hypothesis of the future action of the tracked object. For example, the process 500 can determine that there are one or more possible paths for the tracked object based on the associated mapped lanes (i.e., in-lane assessment). Each one of the possible paths is a hypothesis associated with the tracked object. Each hypothesis associated with the tracked object is maintained by the process 500.

To illustrate the above, an example of hypotheses maintained by the process 500 for a car (i.e., a tracked object that is classified as a "car") is now given. The hypotheses include a Hypothesis 1 and a Hypothesis 2.

Hypothesis 1 includes the discrete object state information: Classification="Car" and Intention="Go Straight at the next intersection." The continuous object state information includes Position=(10, 25) (i.e., 10 meters ahead and 25 meters to the right of the AV) and Velocity=65 MPH. Hypothesis 1 can also include predictions of locations of the car for the next N seconds (i.e., the specified end time). As such, Hypothesis 1 includes object states from t=T (i.e., a current time) to t=T+N.

Hypothesis 2 includes the discrete object state information: Classification="Car" and Intention="Turn right at the next intersection." The continuous object state information includes Position=(10, 25) and Velocity=45 MPH. Hypothesis 2 can also include predictions of locations of the car for the next N seconds (i.e., the specified end time). As such, Hypothesis 2 includes object states from t=T (i.e., a current time) to t=T+N. It is noted that when an object is first created, any hypotheses created for the object can have the same initial position and velocity. However, as the object is tracked (e.g., the states of the hypotheses associated with the object are updated), the positions and/or velocities associated with the different hypotheses can differ, or some hypotheses may drop off while others are added.

These hypotheses describe what actions a tracked object (e.g., a road user other than the host vehicle) can take based on the available map, and hence may be referred to as map-based predictions. Each tracked object has a predicted trajectory along at least one of the hypotheses using, for example, traffic rules and interactions with other road users (i.e., an inferred relationship with nearby tracked objects). For example, a predicted trajectory may include deceleration to a stop line. More than one predicted trajectory may be determined from the hypotheses, and each hypothesis is associated with a likelihood estimation that defines how well the hypothesis explains the behavior of the object.

Figure 6:
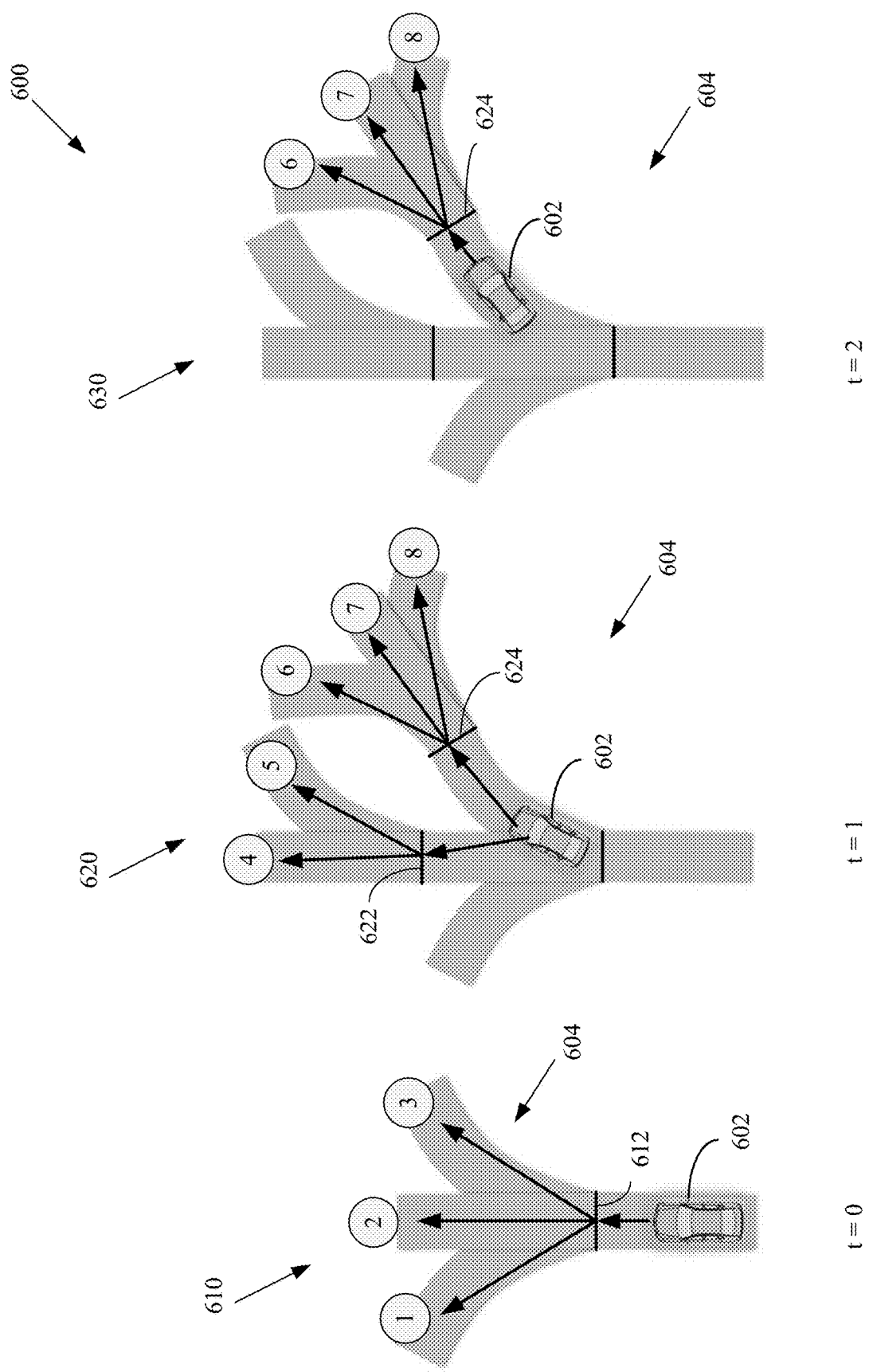
FIG. 6 is an example of creating and maintaining multiple hypotheses in accordance with the present disclosure.

FIG. 6 is an example 600 of creating and maintaining hypotheses in accordance with the present disclosure. The example 600 depicts a vehicle 602 (i.e., a real-world object that is detected by the process 500) traversing a portion of a vehicle transportation network, in this example a roadway 604.

A view 610 illustrates a position of the vehicle 602 at a time t=0. At t=0, the vehicle 602 is located before a fork 612 in the roadway 604. Using a map lane structure obtained from the map information, the process 500 can determine that, once the vehicle 602 arrives at the fork 612, the vehicle 602 can "go left" (corresponding to a path labeled "1"), "go straight" (corresponding to a path labeled "2"), or "go right" (corresponding to a path labeled "3"). As such, the process 500 can create three hypotheses for the vehicle 602; namely a Hypothesis 1, a Hypothesis 2, and a Hypothesis 3 corresponding respectively to the paths labeled 1, 2, and 3. As described above, state information is determined (e.g., calculated, set, or otherwise determined) for each of the hypotheses.

A view 620 illustrates a position of the vehicle 602 at a time t=1. At t=1, as the vehicle 602 can no longer "go left," Hypothesis 1 is removed. If the vehicle 602 follows the "go straight" intention (i.e., Hypothesis 2), then using map information, the process 500 can determine that the vehicle 602 can "go straight" (corresponding to a path labeled "4") or "go right" (corresponding to a path labeled "5"). As such, the process 500 replaces Hypothesis 2 with a Hypothesis 4 and a Hypothesis 5, respectively corresponding to the paths labeled "4" and "5", after the vehicle 602 arrives at a fork 622.

If the vehicle 602 follows the "go right" intention (i.e., Hypothesis 3), then using map information, the process 500 can determine that the vehicle 602 can, after reaching a fork 624, "go left" (corresponding to a path labeled "6"), "go straight" (corresponding to a path labeled "7"), or "go right" (corresponding to a path labeled "8"). As such, the process 500 replaces Hypothesis 3 with a Hypothesis 6, a Hypothesis 7, and a Hypothesis 8, respectively corresponding to the paths labeled "6," "7," and "8."

In an example, the process 500 can determine that a hypothesis for the vehicle 602 is no longer feasible (or feasible with a negligible likelihood) based on factors including a pose, a velocity, and a location of the vehicle 602. A negligible likelihood can be a likelihood that is below a threshold likelihood. More, fewer, or other factors can be used to determine the feasibility of a hypothesis. In an example, the threshold likelihood can be a threshold that is less than 10%. For example, at t=1, as the orientation of the vehicle 602 is estimated to be generally northeast and may be traveling at an estimates speed of 45 MPH, there is a negligible likelihood that the vehicle 602 can still follow the intention of Hypothesis 1.

A view 630 illustrates a position of the vehicle 602 at a time t=2. At t=2, as the vehicle 602 can no longer follow the intentions of Hypotheses 4 and 5, Hypotheses 4 and 5 are removed. Removing a hypothesis can mean setting the hypothesis to an inactive state such that the hypothesis is no longer used in the operations of the process 500.

Referring again to FIG. 5, the process 500 generates a map-based variance at operation 506. The map-based variance may be generated for at least one trajectory for each location along the trajectory. That is, the process 500 can generate a left and a right variance for each of the tracked objects for at least one of the trajectories of the tracked object. Each location along the trajectory corresponds to a predicted position of the tracked object at a future time. The variance is based on the curvature of the predicted path the trajectory corresponds to. As the curvature of the predicted path increases, the variance of the trajectory may increase. To provide more accurate results, a smoothed curvature may be used. The variance may be represented by equation (1).

$$LateralVariance = fixedLateralVariance + factor \times smoothedCurvature$$

In equation (1), the variablefixedLateralVariance may be a number between 0 and 1. A particularly desirable variance assuming a straight road is 1. Additionally, the variable factor may be a number between 0 and 1. The sum of the variables fixedLateralVariance and factor may be less than or equal to 1. The smoothed curvature may be represented by equation (2).

$$smoothedCurvature=(currentcurvature+previouscurvature)/2$$

In equation (2) the variable currentcurvature may be the value of the curvature of the current point along the predicted path for which the process 500 is calculating smoothedcurvature. The variable previouscurvature may be the curvature of the previous point along the predicted path.

The output of equation (1), LateralVariance, may then be combined with each location along the trajectory to create a left and a right variance. The left and right variance together form the map-based variance for each location along the trajectory of the tracked object.

After the initial variance has been generated for each point of the trajectory, operation 508 of the process 500 updates the map-based variance of the location responsive to a map point corresponding to the location. That is, for each location along a trajectory, there may be a corresponding map point contained within the observed drive line mean and variance data. In response to the location having a corresponding map point, the variance of the location is updated based on the observed driveline mean and variance data for the map point. For example, given a location of a trajectory with a left and right variance of 0.25, the total variance of the location may be 0.5. If the observed driveline data corresponding to the location contains a total variance of 1.0, then the variance of the location may be updated. The new left and right variance of the location may be 0.5 each with a total variance of 1.0.

At operation 510, the process 500 generates a dynamic variance in response to a change in the conditions of the vehicle transportation network. The vehicle 202 may detect other external objects 206 within the vehicle transportation network. Some of those external objects may interfere with the trajectory of the tracked object 302. The external object 206 may be another tracked object 302 within the vehicle transportation network. When the external object 206 is determined to interfere with the trajectory of the tracked object 302, the process 500 may generate a dynamic variance to account for the external object 206. The dynamic variance of the predicted trajectory may cause a lateral shift to the variance and the trajectory. The dynamic variance may be represented by equation (3).

$$LateralVariance[i]=min(maxParkedCarVariance,distThreshold-distToParkedCars)$$

In equation (3) the variable LateralVariance[i] represents the current map-based variance to be updated (i.e., the output from equation (1)). The variable maxParkedCarVariance represents the maximum amount that the map-based variance may be increased. The variable distThreshold is the minimum amount of distance between the vehicle 202 and the external object 206. The variable distToParkedCars is the distance to the external object 206. Additionally, as the variances laterally shift, the variance are smoothed to account for actual driving behavior. The smoothing may be accomplished using a Gaussian kernel. However, other suitable smoothing algorithms may be applied.

At operation 512, the process 500 increases the map-based variance to a maximum variance as the location corresponds to a future time greater than a maximum time threshold (i.e., time-based variance). In other words, as the time span between the current time and the future time of the location along the trajectory increase, the variance of the location is increased. The variance may continue to increase up to a maximum variance at a maximum time threshold. Alternatively, the variance may already be at the maximum variance or reach the maximum variance before the maximum time threshold. If the variance is already at the maximum variance, the variance may not increase beyond the maximum variance. The time-based variance may be represented by equation (4).

$$LateralVariance[i]=min(maxLateralVariance,fixedLateralVariance[i-1]+d)$$

In equation (4), the variable LateralVariance[i] represents the variance that is being set for location i. The variable maxLateralVariance is the maximum variance, the variable LateralVariance[i-1] is the variance for the previous location, and the variable d is the amount by which the variance will be increased. The maximum variance and d may be between 0 and 1. A desirable embodiment uses a maximum variance of 1, although other maximum variances may be used. The maximum time threshold may be between 2 and 3 seconds. A desirable embodiment uses a maximum time threshold of three seconds, although other values may be used as the maximum time threshold.

At operation 514, the process 500 operates a vehicle using the map-based variance as an input to a control system. The vehicle may be the vehicle 202 of FIG. 2. The control system may be the controller 114 of FIG. 1. For example, the controller 114 may determine that the vehicle 202 needs to adjust the planned trajectory 314 to avoid colliding with the tracked object 302 due to the variance 308 of the predicted trajectory 312.

Figure 7A:
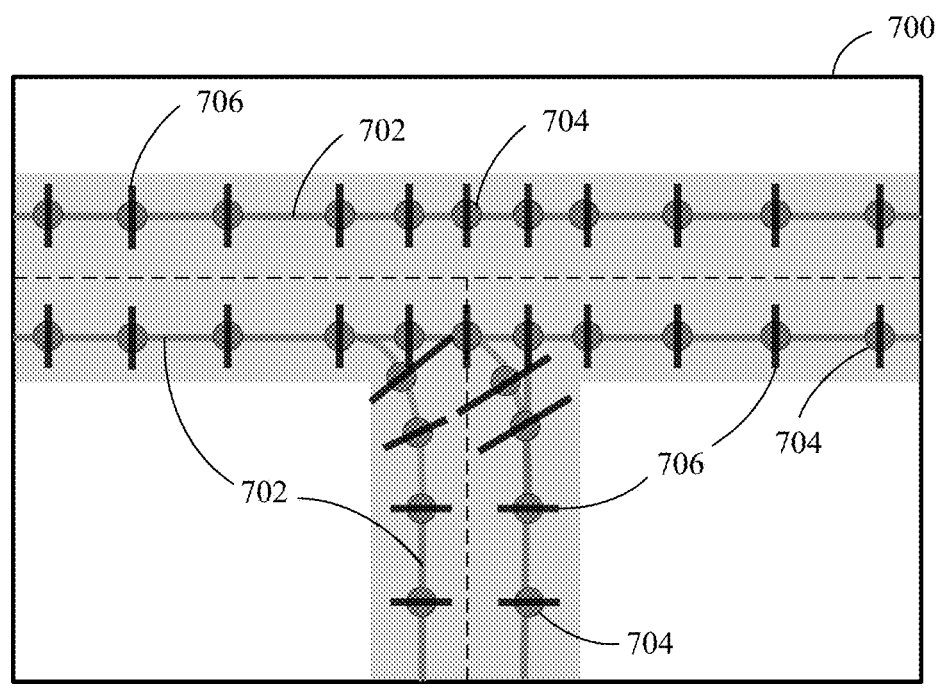
FIG. 7A is an illustration of driveline mean and variance data in accordance with the present disclosure.

FIG. 7A is an illustration 700 of observed driveline mean and variance data. The illustration 700 depicts observed drivelines 702, observed driveline mean data 704, and observed driveline variance data 706. The observed driveline mean and variance data may be the observed driveline and mean data from the operation 502 of process 500. An observed driveline 702 may correspond to multiple map points. For each map point corresponding to the observed driveline 702 there may be an observed driveline mean and an observed driveline variance. The observed driveline variance may be greater than or less than the observed driveline mean. An observed driveline variance that is greater than the mean may be a right variance whereas an observed driveline variance that is less than the mean may be a left variance.

Figure 7B:
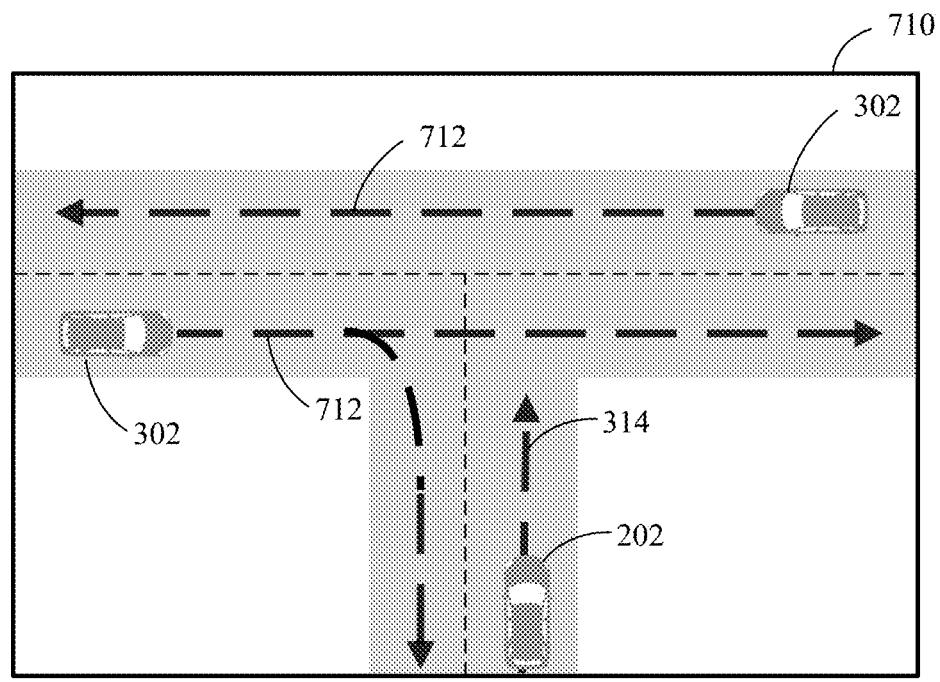
FIG. 7B is an illustration of multiple hypothesis predictions in accordance with the present disclosure.

FIG. 7B is an illustration 710 of multiple trajectories in accordance with the present disclosure. The illustration 710 depicts two tracked objects 302 and one or more trajectories 712 for the two tracked objects 302. Additionally, the illustration 710 depicts the vehicle 202 and a planned trajectory 314. For each trajectory 712, the vehicle 202 may generate a predicted trajectory. While the illustration 710 depicts two tracked objects 302 and three trajectories, this is only for demonstrative purposes. There may be more or fewer depending on the number of other road users detected by the vehicle 202.

Figure 7C:
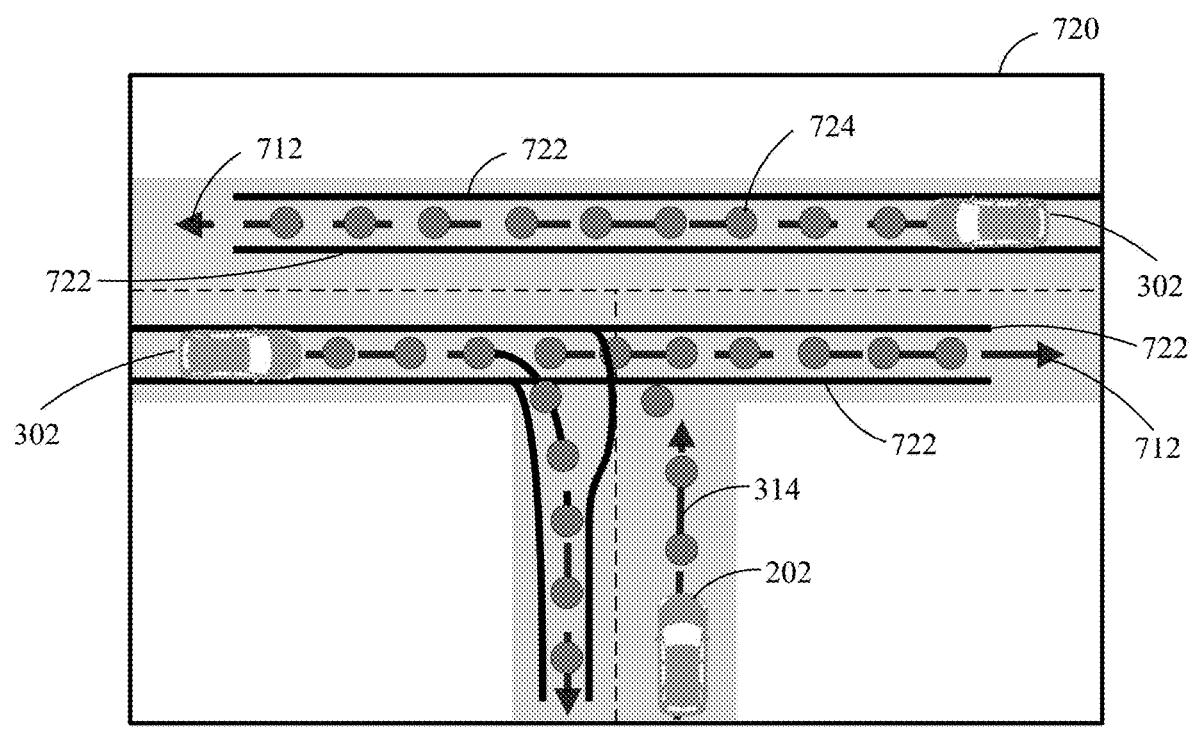
FIG. 7C is an illustration of map-based variances from multiple hypothesis predictions and observed driveline mean and variance in accordance with the present disclosure.

FIG. 7C is an illustration 720 of map-based variances from multiple trajectories and observed driveline mean and variance data in accordance with the present disclosure. The illustration 720 is a depiction of the combination of the observed driveline data with the multiple trajectories to create map-based variances for the trajectories. The illustration 720 depicts two tracked objects 302, three trajectories 712, trajectory locations 724, map-based variances 722 associated with the three trajectories 712, the vehicle 202, and the planned trajectory 314.

The map-based variances 722 may be the mapped based variances generated by operation 506 of the process 500. The variances 722 represent the possible deviation from the trajectory at each location of the trajectory. Each trajectory may have a left and a right variance as described above in reference to operation 508 of process 500. For example, a tracked object 302 that has a trajectory 712 predicting that the tracked object will continue to drive in a straight line may have relatively little deviation from the mean. This may result in a left and a right variance that would be represented as two parallel lines along the trajectory. Alternatively, a tracked object 302 that having a trajectory 712 predicting a right turn may deviate much more in the way the turn is navigated by different road users. As such, the left and right variance may be much larger than that of the tracked object 302 having a trajectory in a straight line. Furthermore, the left and right variance may not be equal or even similar in the amount that each deviate from the mean.

Figure 8A:
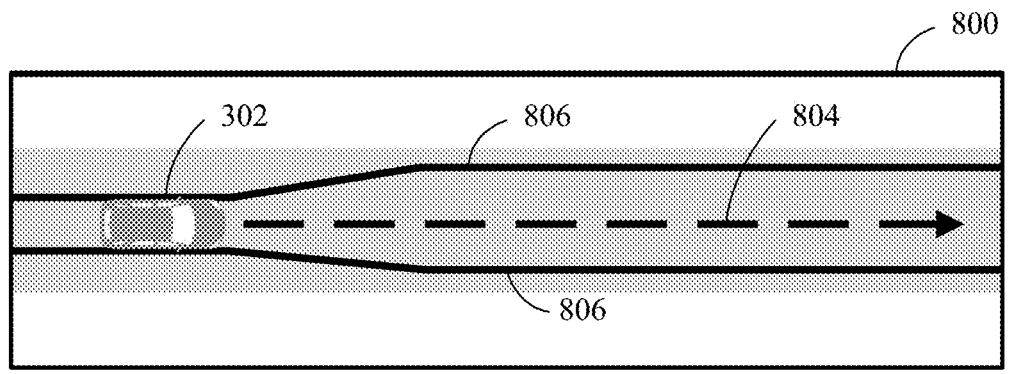
FIG. 8A is an illustration of a time-based variance in accordance with the present disclosure.

FIG. 8A is an illustration 800 of a time-based variance. The illustration 800 depicts a tracked object 302, a trajectory 804 and a variance 806. As the trajectory moves further from the tracked object 302 the variance increases up to a maximum variance. In other words, as the future time associated with each location of the trajectory increases, so does the variance, until the variance is equal to a maximum variance. The time-based variance may be calculated according to equation (4) as described above with reference to operation 512 of the process 500.

Figure 8B:
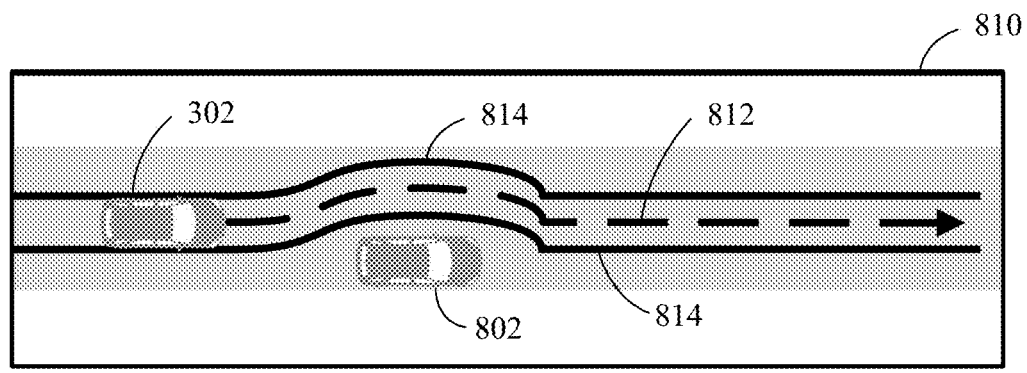
FIG. 8B is an illustration of dynamic variances in accordance with the present disclosure.

FIG. 8B is an illustration 810 of dynamic variances. The illustration 810 depicts a tracked object 302, a trajectory 812 of the tracked object 302, a parked vehicle 802, and a variance 814. The parked vehicle 802 may be another tracked object 302 or the parked vehicle may be an external object 206. As the trajectory 812 of the tracked object 302 approaches the position of the parked vehicle 802 the variance 814 and the trajectory 812 or the tracked object 302 shift laterally, such as in accordance with equation (3) as described above with reference to operation 510 of the process 500.

Figure 9:
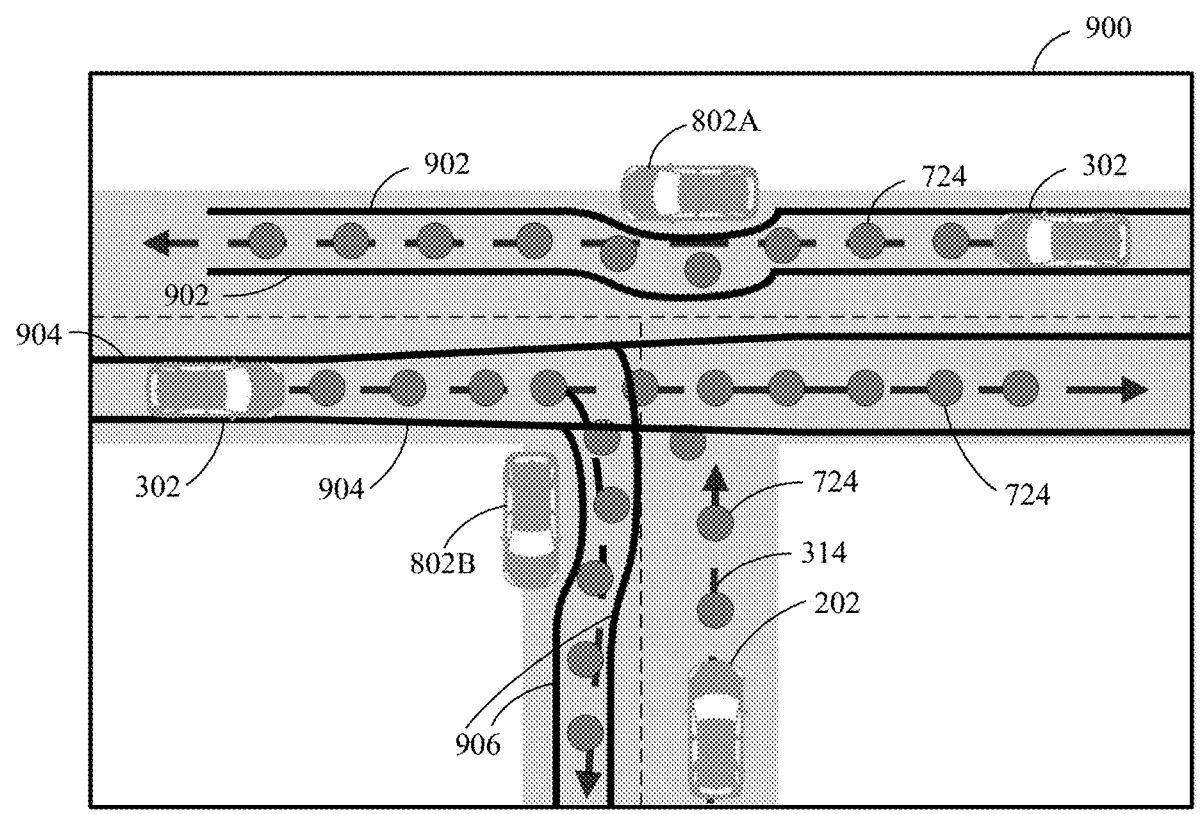
FIG. 9 is an illustration of dynamic and time-based variances combined with map-based variances in accordance with the present disclosure.

FIG. 9 is an illustration 900 of dynamic and time-based variances combined with map-based variances. Illustration 900 depicts tracked objects 302, trajectories 902, 904, 906, parked vehicles 802A, 802B, trajectory location 724, the vehicle 202, and the planned trajectory 314. The trajectory 902 is an example of a dynamic variance applied to a map-based trajectory. As the trajectory 902 for the tracked object 302 approaches the parked vehicle 802A the trajectory is shifted laterally to avoid colliding with the parked vehicle 802. The trajectory 904 is an example of a time-based variance as applied to a map-based variance. As the trajectory 904 moves further from the tracked object 302 the variance increases linearly until reaching a maximum variance as described with reference to operation 510 of the process 500. Once the variance for trajectory 904 increases to the maximum variance, the variance stops increasing.

The trajectory 906 is an example of both a time-based variance and a dynamic variance as applied to a mapped based variance. As the trajectory 906 moves further away from the tracked object 302, the time-based variance increases linearly. As the trajectory 906 approaches the location of the parked vehicle 802B, the dynamic variance shifts laterally to avoid a collision. When both a time-based variance and a dynamic variance are applied to a map-based variance there may be a gradual linear increase in the variance as the location of the trajectory moves further into the future as well as lateral shift of the trajectory as other external object are encountered.

Figure 10:
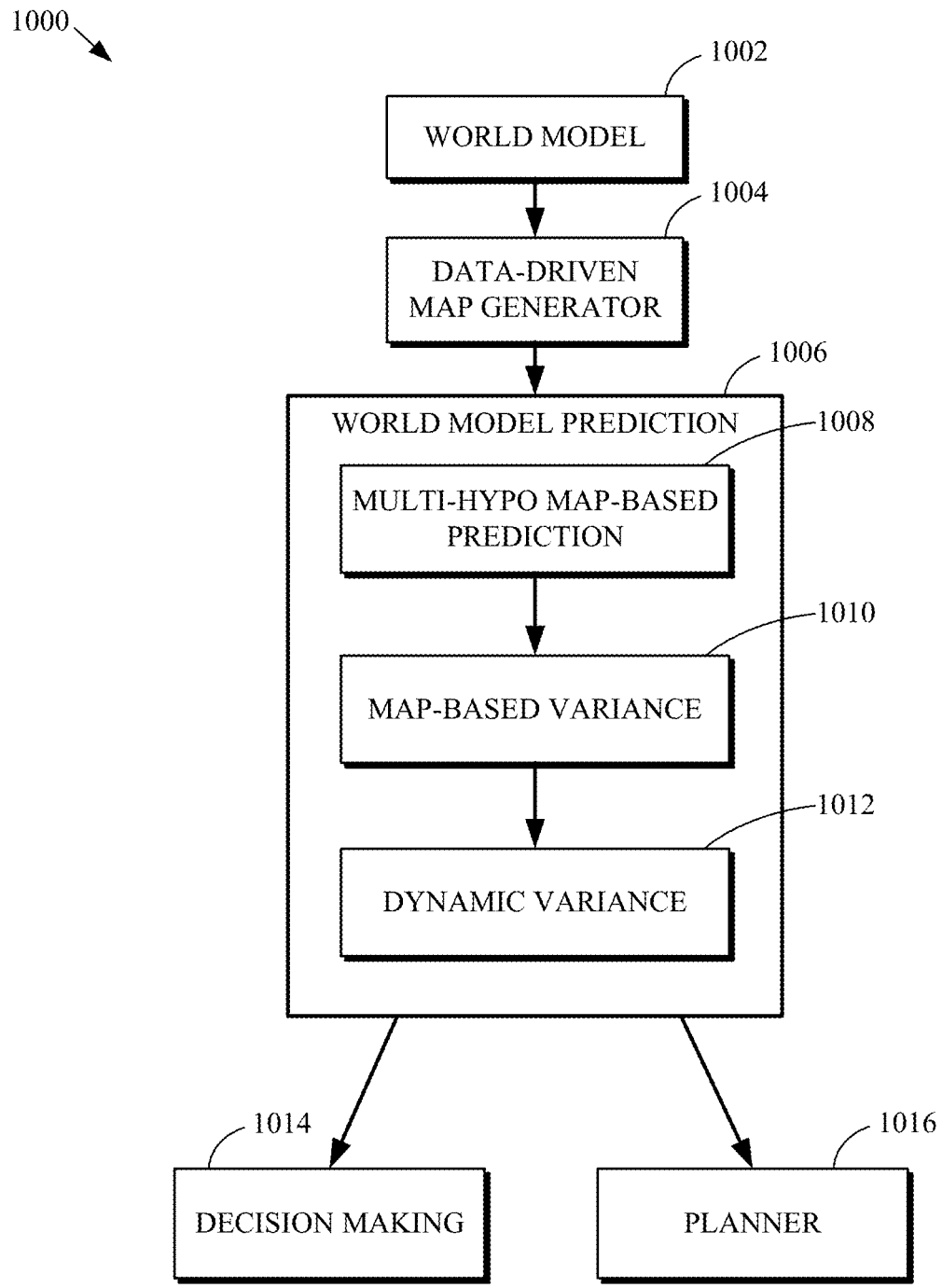
FIG. 10 is an example of components of a subsystem for a vehicle in accordance with the present disclosure.

FIG. 10 is an example of components of a subsystem 1000 for a vehicle 202. The subsystem 1000 represents a subsection of the software pipeline of the vehicle 202, such as the world module 402 of FIG. 4. The subsystem 1000 includes a world model 1002, a data-driven map generator module 1004, a world model prediction module 1006 that may include a multiple-hypothesis map-based prediction module 1008, a map-based variance module 1010, and a dynamic variance module 1012, a decision-making module 1014, and a planer module 1016. The world model 1002 may be generated by the world module 402 of FIG. 4. The data-driven map generator module 1004 may determine the map for a portion of the vehicle transportation network used by operation 502 of the process 500. The map determined by data-drive map generator module 1004 may be used by the world module prediction module 1006. As mentioned previously, the process 500 can also be performed in whole or in part by a remote support control system. Accordingly, the subsystem 1000 may be located in whole or in part at the remote support control.

The world module prediction module 1006 may receive the map for a portion of the vehicle transportation network as input. Based on the map received, the multiple-hypothesis map-based prediction module 1008 may generate the multiple hypotheses used by operation 504 of the process 500 to predict at least one trajectory. The multiple hypotheses along with the trajectory predicted by operation 504 may be output to the map-based variance module 1010.

The map-based variance module 1010 may be used by operation 506 of the process 500 to generate the map-based variance based on the received map, the multiple hypotheses, and the trajectory. The map-based variance may also be used by operation 508 based on a corresponding location of the trajectory with a map-point on the received map. The map-based variance may be output by the map-based variance module 1010 to the dynamic variance module 1012.

The dynamic variance module 1012 may receive as input the map and the map-based variances from the map-based variance module 1010. The dynamic variance module 1012 may be used by the operation 510 of the process 500 to generate a dynamic variance in response to detecting a change in the conditions of the vehicle transportation network. The dynamic variance module may also be used by operation 512 of the process 500 to determine the time-based variance of a given location. The dynamic variance module 1012 may also combine the dynamic variance with the map-based variance and output the combined variance to the decision-making module 1014, which may be similar to the decision-making module 406 of FIG. 4, or the planner module 1016, which may be similar to the route planning module 404 of the trajectory planner 408 of FIG. 4, or any combination thereof.

The decision-making module 1014 and the planner module 1016 may receive the output from the world model prediction module 1006. The decision-making module 1014 may use the map-based variances to determine how the vehicle 202 may react to the tracked object 302. For example, if the map-based variance determines that the tracked object 302 is likely to swerve to avoid a parked vehicle 802, the decision-making module 1014 may determine that the vehicle 202 needs to shift the planned trajectory 314 laterally to avoid a collision with the tracked object 302. In this example, the planner module 1016 may also use the map-based variance to plan a route for changing lanes to accomplish the lateral shift.

For simplicity of explanation, the technique or process 500 is depicted and described as a series of operations.

However, the operations in accordance with this disclosure can occur in various orders and/or concurrently. Additionally, other steps or operations not presented and described herein may be used. Furthermore, not all illustrated operations may be required to implement a technique in accordance with the disclosed subject matter.

As used herein, the terminology "driver" or "operator" may be used interchangeably. As used herein, the terminology "brake" or "decelerate" may be used interchangeably. As used herein, the terminology "computer" or "computing device" includes any unit, or combination of units, capable of performing any method, or any portion or portions thereof, disclosed herein.

As used herein, the terminology "instructions" may include directions or expressions for performing any method, or any portion or portions thereof, disclosed herein, and may be realized in hardware, software, or any combination thereof. For example, instructions may be implemented as information, such as a computer program, stored in memory that may be executed by a processor to perform any of the respective methods, algorithms, aspects, or combinations thereof, as described herein. In some implementations, instructions, or a portion thereof, may be implemented as a special-purpose processor or circuitry that may include specialized hardware for carrying out any of the methods, algorithms, aspects, or combinations thereof, as described herein. In some implementations, portions of the instructions may be distributed across multiple processors on a single device, or on multiple devices, which may communicate directly or across a network, such as a local area network, a wide area network, the Internet, or a combination thereof.

As used herein, the terminology "example," "embodiment," "implementation," "aspect," "feature," or "element" indicate serving as an example, instance, or illustration. Unless expressly indicated otherwise, any example, embodiment, implementation, aspect, feature, or element is independent of each other example, embodiment, implementation, aspect, feature, or element and may be used in combination with any other example, embodiment, implementation, aspect, feature, or element.

As used herein, the terminology "determine" and "identify," or any variations thereof, includes selecting, ascertaining, computing, looking up, receiving, determining, establishing, obtaining, or otherwise identifying or determining in any manner whatsoever using one or more of the devices shown and described herein.

As used herein, the terminology "or" is intended to mean an inclusive "or" rather than an exclusive "or." That is, unless specified otherwise or clearly indicated otherwise by the context, "X includes A or B" is intended to indicate any of the natural inclusive permutations thereof. If X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from the context to be directed to a singular form.

Further, for simplicity of explanation, although the figures and descriptions herein may include sequences or series of operations or stages, elements of the methods disclosed herein may occur in various orders or concurrently. Additionally, elements of the methods disclosed herein may occur with other elements not explicitly presented and described herein. Furthermore, not all elements of the methods described herein may be required to implement a method in accordance with this disclosure. Although aspects, features, and elements are described herein in particular combinations, each aspect, feature, or element may be used independently or in various combinations with or without other aspects, features, and/or elements.

While the disclosed technology has been described in connection with certain embodiments, it is to be understood that the disclosed technology is not to be limited to the disclosed embodiments but, on the contrary, is intended to cover various modifications and equivalent arrangements included within the scope of the appended claims, which scope is to be accorded the broadest interpretation as is permitted under the law so as to encompass all such modifications and equivalent arrangements.

What is claimed is:

1. A method, comprising:
   determining a map of a portion of a vehicle transportation network, wherein the map comprises observed driveline mean and variance data for one or more map points;
   predicting at least one trajectory for a tracked object, wherein a trajectory of the at least one trajectory includes a series of locations, a location of the series of locations corresponding to a respective predicted position of the tracked object at a future time;
   generating, for each location of the trajectory, a map-based variance based on a smoothed curvature of the trajectory and the observed driveline mean and variance data for the one or more map points; and
   operating a vehicle using the map-based variance as input to a control system of the vehicle.

2. The method of claim 1, comprising:
   updating the map-based variance of the location in response to a map point of the one or more map points corresponding to the location.

3. The method of claim 1, wherein the map-based variance increases to a maximum variance in response to the location corresponding to a future time greater than a maximum time threshold.

4. The method of claim 1, comprising:
   generating, for the map-based variance, a dynamic variance in response to a change in conditions within the vehicle transportation network as the tracked object follows the trajectory, wherein the dynamic variance shifts the map-based variance laterally.

5. The method of claim 4, comprising:
   increasing the map-based variance, for a location, to a maximum variance, wherein the location corresponds to a future time greater than a maximum time threshold.

6. The method of claim 5, wherein the maximum variance is between 0 and 1 and the maximum time threshold is between 2 and 3 seconds.

7. The method of claim 1, wherein the at least one trajectory for the tracked object is based on an in-lane assessment.

8. The method of claim 1, wherein the at least one trajectory for the tracked object is based on an inferred relationship with nearby tracked objects.

9. The method of claim 1, wherein the map-based variances comprise a left variance and a right variance.

10. The method of claim 1, wherein generating the map-based variance comprises:
    determining a previous curvature and a current curvature for the trajectory;
    calculating the smoothed curvature based on the previous curvature and the current curvature; and calculating the map-based variance based on the smoothed curvature, a variance factor, and a fixed variance.

11. An apparatus, comprising:
a memory; and
a processor configured to execute instructions stored in the memory to:
    determine a map of a portion of a vehicle transportation network, wherein the map comprises observed driveline mean and variance data for one or more map points;
    predict at least one trajectory for a tracked object, wherein a trajectory of the at least one trajectory includes a series of locations, a location of the series of locations corresponding to a respective predicted position of the tracked object at a future time;
    generate, for each location of the trajectory, a map-based variance based on a smoothed curvature of the trajectory and the observed driveline mean and variance data for the one or more map points;
    increase the map-based variance, for a location, to a maximum variance, wherein the location corresponds to a future time greater than a maximum time threshold; and
    operate a vehicle using the map-based variance as input to a control system of the vehicle.

12. The apparatus of claim 11, wherein the processor is configured to execute instructions stored in the memory to:
    update the map-based variance of the location in response to a map point of the one or more map points corresponding to the location.

13. The apparatus of claim 11, wherein the map-based variance increases to a maximum variance in response to the location corresponding to a future time greater than a maximum time threshold.

14. The apparatus of claim 11, wherein the processor is configured to execute instructions stored in the memory to:
    generate, for the map-based variance, a dynamic variance in response to a change in a condition within the vehicle transportation network as the tracked object follows the trajectory, wherein the dynamic variance shifts the map-based variance laterally.

15. The apparatus of claim 11, wherein generating the map-based variance comprises:
    determining a previous curvature and a current curvature for the trajectory;
    calculating the smoothed curvature based on the previous curvature and the current curvature; and
    calculating the map-based variance based on the smoothed curvature, a variance factor, and a fixed variance.

16. A non-transitory computer-readable medium storing instructions operable to cause one or more processors to perform operations comprising:
    determining a map of a portion of a vehicle transportation network, wherein the map comprises observed driveline mean and variance data for one or more map points;
    predicting at least one trajectory for a tracked object, wherein a trajectory of the at least one trajectory includes a series of locations, a location of the series of locations corresponding to a respective predicted position of the tracked object at a future time;
    determining a previous curvature and a current curvature for the trajectory;
    calculating a smoothed curvature based on the previous curvature and the current curvature;
    generating, for each location of the trajectory, a map-based variance based on the smoothed curvature, a variance factor, a fixed variance, and the observed driveline mean and variance data for the one or more map points; and
    operating a vehicle using the map-based variance as input to a control system of the vehicle.

17. The non-transitory computer-readable medium storing instructions of claim 16, the operations comprising:
    generating, for the map-based variance, a dynamic variance in response to a change in a condition within the vehicle transportation network as the tracked object follows the trajectory, wherein the dynamic variance shifts the map-based variance laterally.

18. The non-transitory computer-readable medium storing instructions of claim 17, the operations comprising:
    increasing the map-based variance, for a location, to a maximum variance, wherein the location corresponds to a future time greater than a maximum time threshold.

19. The apparatus of claim 11, wherein the maximum variance is between 0 and 1 and the maximum time threshold is between 2 and 3 seconds.

20. The non-transitory computer-readable medium storing instructions of claim 16, wherein the map-based variances comprise a left variance and a right variance.

* * * * *